United States Patent Office 2,913,435
Patented Nov. 17, 1959

2,913,435

ACROLEIN-PENTAERYTHRITOL RESINS AND MODIFIER THEREFOR

Howard R. Guest, Charleston, Joe T. Adams, St. Albans, and Ben W. Kiff, Ona, W. Va., assignors to Union Carbide Corporation, a corporation of New York No Drawing. Application July 10, 1956
Serial No. 596,823

5 Claims. (Cl. 260—67)

The subject of this invention is a resin formed by the condensation of acrolein and pentaerythritol and a modifier for such condensation products to form cured polymers of higher heat resistance.

The formation of polymers by the condensation of acrolein and pentaerythritol is known, but the process has been given only limited attention. At present, two methods are known for carrying out the polymer reaction. According to one method, the reaction is carried out by first forming and isolating the unsaturated acetal resulting from the reaction of acrolein and pentaerythritol, having the structure:

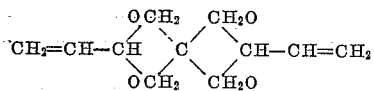

3,9-divinylspirobi (m-dioxane), M.P. 43° C. (diallylidenepentaerythritol)

This unsaturated acetal is then reacted with a polyhydric alcohol in the presence of an acidic catalyst to yield a polymer. Suitable polyhydric alcohols include sorbitol, trimethylolethane or trimethylol propane. This method has the disadvantage that isolation and purification of the intermediate acetal is required.

The practice of the second method involved the formation of a liquid pre-condensate by reacting acrolein and pentaerythritol in reciprocal proportion to their functionality. Thus, pentaerythritol has a functionality of four as a polyhydric alcohol, and acrolein has a functionality of three, considering the reactivity of both the carbonyl group and the olefinic group. The pre-condensate thus formed on reacting about three moles of pentaerythritol and about four moles of acrolein in the presence of an acid catalyst is a viscous liquid or A-stage resin which slowly condenses to a solid plastic. However, for practical applications, the condensation can be stopped by the neutralization of the catalyst. The neutral liquid pre-condensate can be stored until needed and can then be hardened into a plastic by the addition of a mineral acid or a strong organic acid. However, this method has the disadvantage that the resulting plastic materials have very poor impact strength.

As described in our copending application Serial No. 596,431, filed July 9, 1956, entitled Catalytic Process for Making Stable Acrolein-Pentaerythritol Condensates, it has been found that hydrochloric acid is an excellent catalyst for the first stage or acetal reaction between acrolein and pentaerythritol. However, this acid is a poor catalyst for the curing or etherification reaction, so that complete removal of the catalyst from the first or A-stage resin is not required in order to obtain an A-stage or liquid resin which will not harden on storage. It is desirable, however, to remove as much of the catalyst as is possible by stripping.

Because hydrochloric acid is a poor etherification catalyst, it is possible to carry the first stage reaction to high viscosities without danger of premature gelation of the reactants in the kettle. By control of the viscosity of the A-stage resin, it is possible to adjust the properties of the cured polymer. Thus, if the reaction is stopped when the viscosity of the mixture is 50 to 75 cps., and the resin, after removal of volatile materials, is cured with another catalyst, the polymer so produced has a relatively high heat distortion point of about 90° C. to 100° C. or higher but only moderate impact strength. On the other hand, if the reaction is continued until the resin viscosity is 75 to 350 cps., the polymer made from such material has a lower heat distortion point, but excellent impact strength. Efforts to obtain resins of optimum properties by blending high and low viscosity resins have not been too promising. While the viscosity of the reaction mixture can be used as a control measure to determine the resin viscosity desired, a more precise determination of the viscosity of the A-stage resin is accomplished after stripping off volatile material. Thus after removing volatile materials, for instance, those which boil below 150° C. at atmospheric pressure, a low viscosity A-stage resin may be defined as one having a viscosity of 5,000 to 25,000 cps. at 40° C. Similarly, a high viscosity resin may be considered to have a viscosity of 25,000 to 500,000 cps. at 40° C.

It has now been found that resins having excellent heat distortion points and good impact strength can be obtained by adding a small amount, i.e. from 2% to 15%, and preferably from 4% to 10% of acrolein dimer to the liquid A-stage resins, and curing the resins in the presence of an acidic catalyst.

The use of the acrolein dimer as a modifier is not confined to those resins in which the A-stage material is prepared using hydrochloric acid as catalyst. If so desired, the first reaction between acrolein and pentaerythritol can be catalyzed by any one of several catalysts such as sulfuric acid, toluenesulfonic acid, or benzenesulfonic acid. While the mixture is still liquid the acrolein dimer may be added in the desired amount and the resin then cured using the same catalyst which was present during the first reaction. In addition, if so desired, catalysts of this type may be used for the reaction to produce the A-stage polymer and when it is completed the acid may be neutralized with a base, such as sodium carbonate or sodium acetate. The acrolein dimer may then be added and the resin cured in the desired fashion.

If the acrolein dimer is added to A-stage resin which has been produced using hydrochloric acid in the process described above, any one of a number of acids or acid-reacting compounds can be used as curing catalysts. Among these are sulfuric acid, toluenesulfonic acid, benzenesulfonic acid, phosphoric acid, stannic chloride, aluminum chloride, ferric chloride, boron trifluoride, titanium tetrachloride, and mixed alkanesulfonic acids (a mixture which is predominantly ethanesulfonic acid but which contains some methanesulfonic and propanesulfonic acids).

The resins may be cured at temperatures from 50° C. to 200° C. with the preferred range being 70° to 120° C. The curing time required may range from a few minutes to 72 hours depending upon the temperature. Thus at 50° C. as long as 72 hours may be required while at 150° C. as little as ten minutes may be sufficient. At 70° C. the usual curing time is 16 hours while at 100° C. from three to eight hours is required.

The reaction to produce the A-stage material is best accomplished at 70° to 80° C. although it can be run as low as 60° C. and range as high as 100° C. The reaction time may be varied from 30 minutes to five hours depending upon the viscosity desired. The molar ratio of acrolein to pentaerythritol may vary from 1.3/1 to 1.9/1, and also affects the viscosity of the resin.

Acrolein dimer (3,4-dihydro-2H-pyran-2-carboxaldehyde) is available commercially. It is formed by the Diels-Alder condensation of two moles of acrolein as follows:

$$2CH_2=CH-CHO \longrightarrow \text{Acrolein Dimer}$$

Acrolein      Acrolein Dimer

The dimer reacts readily with alcohols in the presence of acid catalysts. The A-stage resin, as described herein, contains olefinic unsaturation as well as free hydroxyl groups. It is probable that the acrolein dimer reacts with the hydroxyl groups of the resin to form cross-linked polymers through the formation of polyacetals. The final resins, however, are hard and tough as distinguished from the known resins formed by reacting acrolein dimer with alcohols including polyhydric alcohols, such as pentaerythritol, which are quite brittle.

The cured resins of this invention may be used in any of the applications where rigid plastic materials of good strength and toughness, and light in color, are desired. Thus, because of their excellent light stability and resistance to hydrolysis, they are valuable for many fields now served by the methyl methacrylate resins, such as display signs, ornaments, fixtures, and dentures. The liquid resins may also be used for sealing and potting compounds in the electrical industry. They are also valuable as laminating resins in making laminates of glass cloth.

The following examples will serve to illustrate the invention:

*Example 1.—Preparation of acrolein pentaerythritol resin with hydrochloric acid catalyst with addition of acrolein dimer*

A charge of 291 g. of acrolein (96%), 408 g. pentaerythritol and 2.27 g. of 37% hydrochloric acid was placed in a 1 liter reaction flask equipped with a stirrer, thermometer, condenser and nitrogen feed line. The mixture was heated at 74° C. for 53 minutes. At the end of that time the viscosity of the mixture was 75 centipoises at 25° C. The water of reaction and the unreacted acrolein were then distilled off. The stripped resin weighed 563 g.

To 543 g. of this A-stage material there was then added 1.77 g. of mixed alkanesulfonic acids. A portion of this was cured 8 hours at 100° C. and the cured resin had the following properties:

| | |
|---|---|
| Heat distortion ° C. | 83 |
| Flexural modulus p.s.i. | 325,000 |
| Hardness durometer "D" | 82 |
| Impact strength (Izod) ft.-lbs. per in. of notch | 0.9 |

To 100 g. of the A-stage containing the catalyst there was added 5.2 g. of acrolein dimer. This mixture was cured in the usual way for 8 hours at 100° C. The cured resin had these properties:

| | |
|---|---|
| Heat distortion ° C. | 99 |
| Flexural modulus p.s.i. | 364,000 |
| Hardness durometer "D" | 85 |
| Impact strength (Izod) ft.-lbs. per in. of notch | 1.1 |

*Example 2.—Preparation of high viscosity acrolein-pentaerythritol resin with hydrochloric acid catalyst with addition of acrolein dimer*

To the reactor described in Example 1 there was charged 354 g. of acrolein (96.4%), 500 g. pentaerythritol, and 3.69 g. of 37% HCl. The mixture was heated at 75° C. for 35 minutes. At the end of that time the viscosity of the reaction mixture was 135 cps. at 25° C. The water of reaction and the unreacted acrolein were distilled off and the residual A-stage weighed 684 g.

To 80 g. of this material there was then added 0.1008 g. of mixed alkanesulfonic acid. After curing at 100° C. for 8 hours the resin had these properties:

| | |
|---|---|
| Heat distortion ° C. | 83 |
| Flexural modulus p.s.i. | 369,000 |
| Hardness durometer "D" | 83 |
| Impact strength (Izod) ft.-lbs. per in. of notch | 1.3 |

A mixture of 75.8 g. of the stripped resin, 4.305 g. of acrolein dimer and 0.1182 g. of alkanesulfonic acid was then cured in the same way for 8 hours at 100° C. This was 5.4% of the dimer based on the total weight of the resin. The cured material had these properties:

| | |
|---|---|
| Heat distortion ° C. | 93 |
| Flexural modulus p.s.i. | 346,000 |
| Hardness durometer "D" | 83 |
| Impact strength (Izod) ft.-lbs. per in. of notch | 0.7 |

Another mixture of 72 g. of the stripped resin, 8.2 g. of acrolein dimer and 0.1047 g. of mixed alkanesulfonic acids was cured for 8 hours at 100° C. This material contained about 10% of dimer. The cured resin had these properties:

| | |
|---|---|
| Heat distortion ° C. | 97 |
| Flexural modulus p.s.i. | 346,000 |
| Hardness durometer "D" | |
| Impact strength (Izod) ft.-lbs. per in. of notch | 0.9 |

What is claimed is:

1. A curable composition comprising a liquid condensate of acrolein and pentaerythritol having a viscosity on a volatile free basis of 5,000 to 500,000 cps. at 40° C. and containing a quantity of acrolein dimer amounting to 2% to 15% of the total composition.

2. A curable composition comprising a liquid condensate of acrolein and pentaerythritol containing a quantity of acrolein dimer amounting to 4% to 10% of the total composition.

3. A curable composition comprising a liquid condensate of acrolein and pentaerythritol having a viscosity on a volatile free basis of 25,000 to 500,000 cps. at 40° C. and containing a quantity of acrolein dimer amounting to 4% to 10% of the total composition.

4. A curable composition comprising a viscous liquid formed by the condensation of acrolein and pentaerythritol in the presence of hydrochloric acid, and a quantity of acrolein dimer amounting to 2% to 15% of the total composition.

5. A hard and tough polymer of good heat-resistance formed by curing in the presence of an acid catalyst a mixture containing acrolein dimer and a viscous liquid condensate of acrolein and pentaerythritol, the amount of acrolein dimer in the uncured mixture being from 4% to 10% of the total mixture.

References Cited in the file of this patent

UNITED STATES PATENTS 2,401,776    Rothrock _____ June 11, 1946

OTHER REFERENCES

Alder et al.: Berichte Deut. Chem. Gesel. vol. 74, 1941, pp. 920–922. (Copy in Scie. Libr.)

Schulz et al.: Angewandte Chemie, vol. 62, No. 5, 1950, pp. 105–118. (Copy in Scie. Libr.)